United States Patent [19]

Surot

[11] 4,449,732
[45] May 22, 1984

[54] REVERSIBLE FOLDABLE PUSH-CHAIR FOR CHILDREN

[75] Inventor: Patrick Surot, Cholet, France

[73] Assignee: Ampafrance S.A., Castres, France

[21] Appl. No.: 347,607

[22] Filed: Feb. 10, 1982

[30] Foreign Application Priority Data

Feb. 13, 1981 [FR] France ............................... 81 02878
Jun. 24, 1981 [FR] France ............................... 81 12404

[51] Int. Cl.³ ............................................. B62B 7/06
[52] U.S. Cl. ................................. 280/644; 280/647; 280/47.36; 297/183
[58] Field of Search ......................... 297/183, DIG. 4; 280/644, 647, 47.34, 47.36, 47.38, 47.39

[56] References Cited

U.S. PATENT DOCUMENTS 4,191,397  3/1980  Kassai ................................ 280/647

FOREIGN PATENT DOCUMENTS

| 388686 | 6/1932 | Belgium . |
| 1505808 | 5/1969 | Fed. Rep. of Germany ...... 280/644 |
| 664813 | 9/1929 | France . |
| 2259001 | 8/1975 | France . |
| 2406555 | 5/1979 | France . |
| 2464172 | 6/1979 | France . |
| 2458443 | 1/1981 | France . |
| 169326 | 9/1921 | United Kingdom . |
| 1516828 | 7/1978 | United Kingdom . |

Primary Examiner—Joseph F. Peters, Jr.
Assistant Examiner—Michael Mar
Attorney, Agent, or Firm—Karl W. Flocks; A. Fred Starobin; Sheridan Neimark

[57] ABSTRACT

A reversible foldable push-chair of the umbrella type comprises, on both sides of a hammock carried thereon, a tipping joint core and branches articulated to said core, each branch carrying a wheel, a control pushing arm for controlling sliding and tipping motions and passing through each of the cores, and link means connecting said arm to said branches such that depending on the tipping motion imposed upon the cores by said sliding arm, there is obtained display and locking of the push-chair to a "facing mother" or "look ahead" positions.

The push-chair is usually applied to transportation of children.

7 Claims, 10 Drawing Figures

REVERSIBLE FOLDABLE PUSH-CHAIR FOR CHILDREN

This invention relates to a reversible foldable push-chair for children.

Push-chairs called "umbrellas" are known, comprising a central slidable rod to permit folding up and displaying of the wheel carrying feet.

The push-chair according to this invention is of the umbrella type which permits the push-chair to be folded up and displayed in the direction of motion thereof, has the supplementary feature of being reversible according to two positions of the hammock or basket received thereon, i.e. a "facing mother" position and a "look ahead" position.

Moreover, there have been known for a certain time children's carriages in which a handle bar was arranged to be pivotable from the front to the rear, or vice-versa, to permit reversal of the direction of motion.

In one form of the embodiment the push-chair according to the invention comprises, on either side of the hammock or basket, a tipping core or tipping joint, and wheel carrier branches hingedly connected to said core, a pushing arm for sliding and tipping control, said arm traversing each of said cores, and link means connecting each of said sliding arms to said branches in such a way that depending on the tipping motion exerted upon the core by said sliding arm, the push-chair is allowed to unfold and become locked either in a "facing mother" position or in a "look ahead" position.

Each of said cores is formed with a groove therein for receivng and locking in each branch adjacent its hinge connection.

Link means consist of forks jointed to said branches, as well as to one another as a pair of compasses, and lying in alignment with one another both in the "facing mother" position and the "look ahead" position, a link connecting said forks and said pushing control arm together.

In accordance with an another form of embodiment of this invention, the equipment of the push-chair is improved by providing a link having a groove therein and traversed by the axis of its hinge connection with the pushing arm, and by transforming its travel to a simultaneous combined lifting and inclination movement, such inclination being effected as desired either in the "facing mother" direction or in the "look ahead" direction.

Such a feature also results in the hinge pivots of the forks on the branches being lowered, and as the level of the aligned forks is sufficiently low, it is taken advantage of the lower position to make at least one of the forks work as a footboard.

On each core there is also pivotably mounted a longitudinal rod adjustable in position to support the hammock or basket.

The supporting rods for the hammock or basket may carry a bedding consisting of one to three elements, i.e. a sleeping bag; a sleeping bag and a hood; and a "stocking".

Other characteristics and advantages of this invention will appear from the following description made with reference to the attached drawings in which:

FIG. 1 a lateral elevational view of one side of a push-chair in the folded up position;

Figure 9:
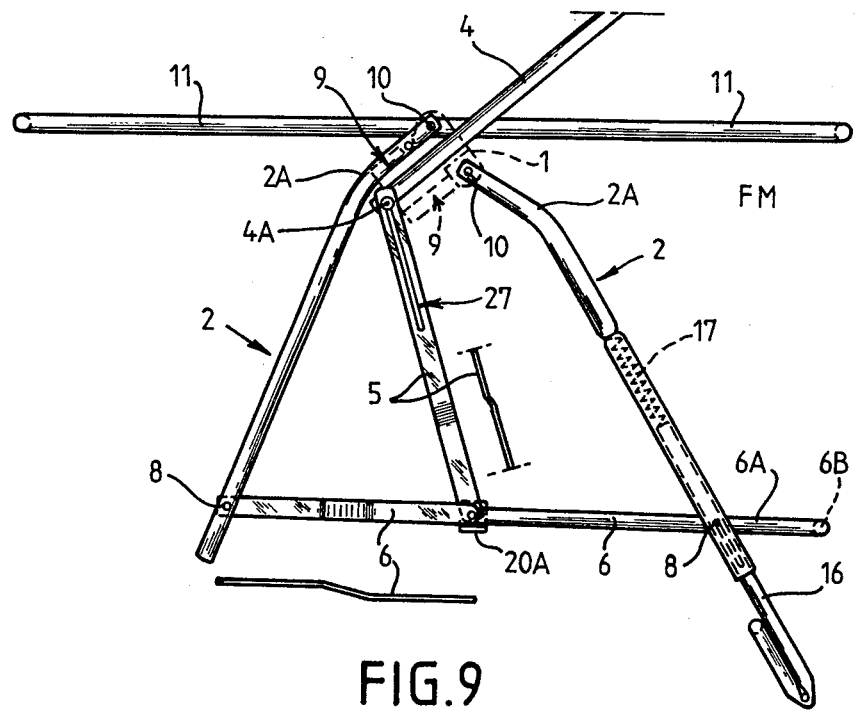
Figure 10:
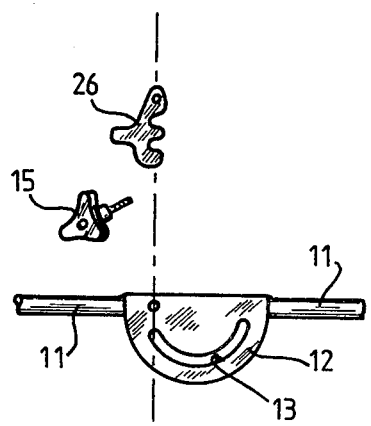

FIG. 9 is a partial lateral elevational view of one side of another form of embodiment of the push-chair according to the invention; the tipping over being completed to reach the "facing mother" position, and the hammock support being limited to one of its longitudinal rods for simplifying the drawings; and, FIG. 10 is an exploded view of position adjusting means for a longitudinal rod of the hammock.

In the form of embodiment shown in FIGS. 1 to 8, each side of the push-chair according to the invention consists of a tipping core or tipping joint 1 to which branches 2 are hingedly mounted, each branch carrying a wheel 3. The tipping core 1 is moreover traversed by a pushing arm 4 slidable in said core to control the folded up or displayed position of the branches 2. To this end, the pushing arm 4 is joined through a link 5 to two forks 6 jointed as a pair of compasses at 7 to said link and each being hingedly mounted at 8 to one of the two branches 2.

The core 1 on both sides of the slidable arm 4 is formed with a groove therein 9 for receiving and locking by the action of a clamp one of the branches 2 which each are hingedly mounted at 10 in the neighbourhood of one of the ends of the receiving groove 9.

Each branch is curved to present a portion 2A to be received in one of the grooves 9, and a portion 2B carrying the wheel 3 and coming nearer to the centerline A—A of the push-chair when the latter is being folded up, thereby making the push-chair as little cumbersome as possible in said position.

On each side of the push-chair, there is pivotally mounted on the core 1, a longitudinal rod 11 for carrying the hammock or basket, and generally, the bedding for receiving a child.

In the form of embodiment shown, the pivot of the longitudinal rod 11 is aligned with the articulation axis of one of both branches 2. The position of the longitudinal rod with respect to the core can be adjusted by means of a sector 12 with an arcuate slot 13 therein to receive a shaft 14 traversing one of the branches 2, said shaft being tightened by means of a wing nut 15.

The branches 2 in their portions 2B can be suspended telescopically. To this end, a rod 16 carrying the wheel 3 is slidable in the portion 2B of the branch against a spring 17 disposed between a fixed resting point and a rod 16. The stroke of the rod is limited by a lug 18 penetrating in a slot 19 of rod 16.

Figure 1:
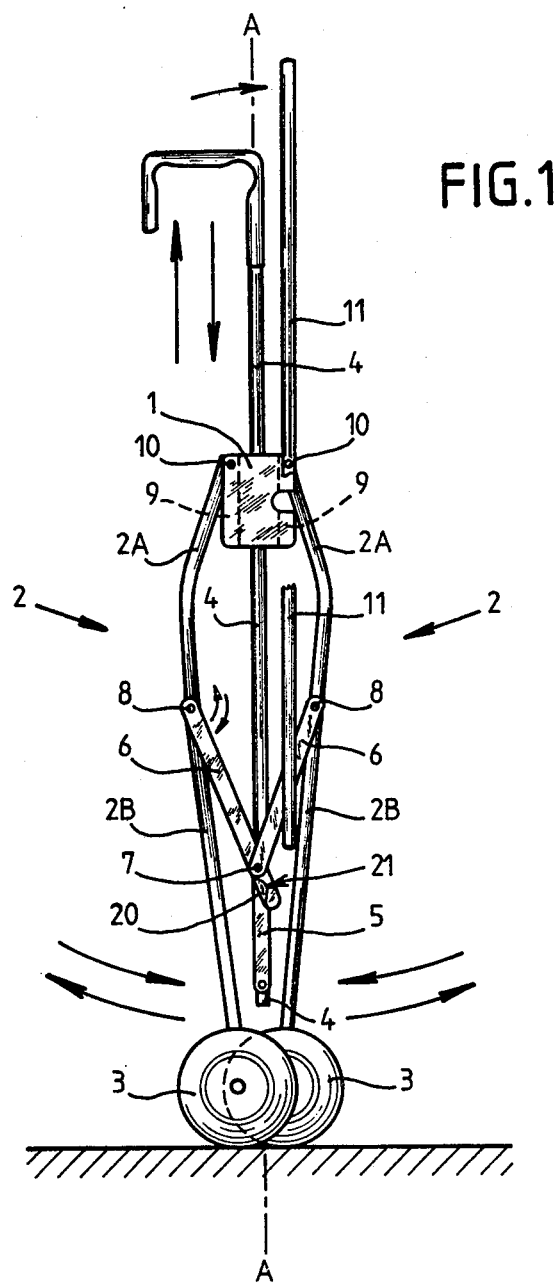
Figure 2:
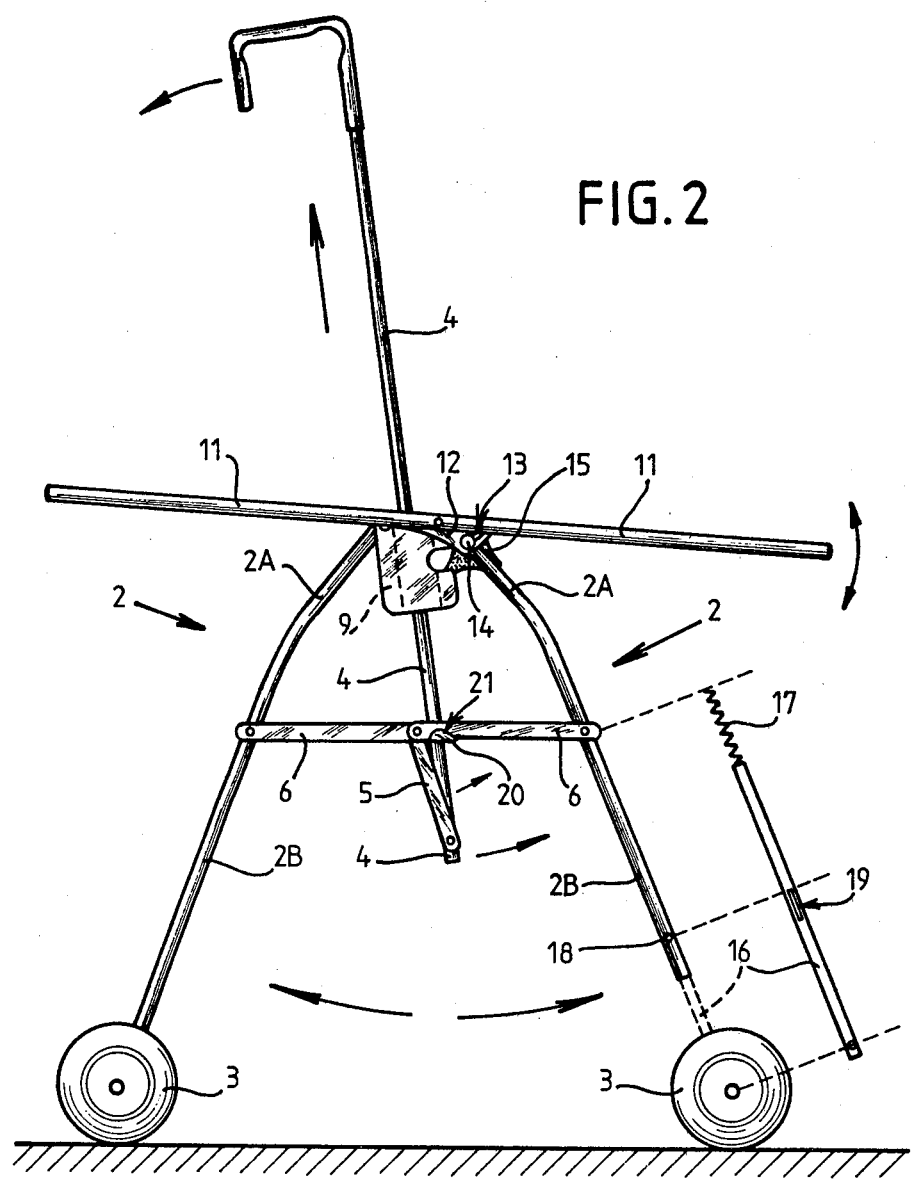
FIG. 2 is a lateral elevational view partly exploded of the same side of the push-chair during the unfolding of the assembly, and tipping over of the core in one of the two possible tipping directions.
Figure 3:
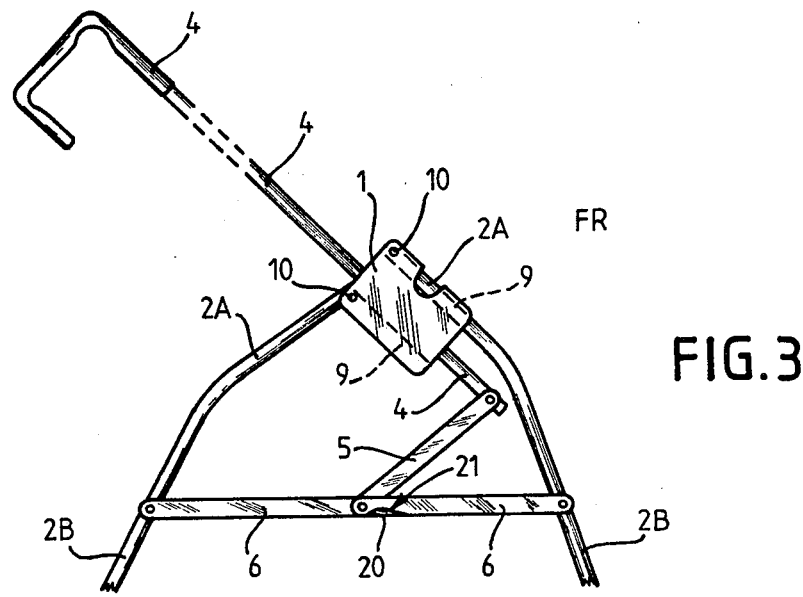
FIG. 3 is a partial lateral elevational view of the mentioned side of the push-chair, the tipping motion being completed to reach the "look ahead position", and the hammock support being removed for clarity of the drawings.
Figure 4:
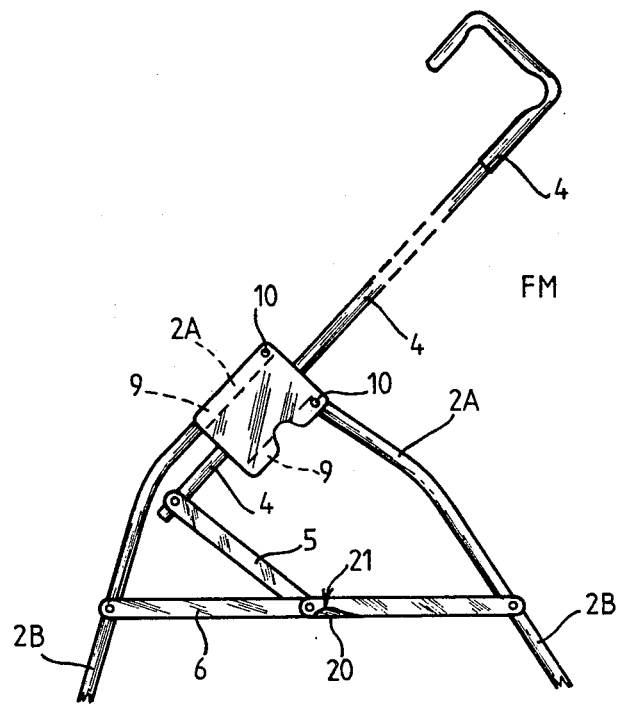
FIG. 4 is a view similar to FIG. 3, except that the side of the push-chair is shown in the "facing mother" position.
Figure 5:
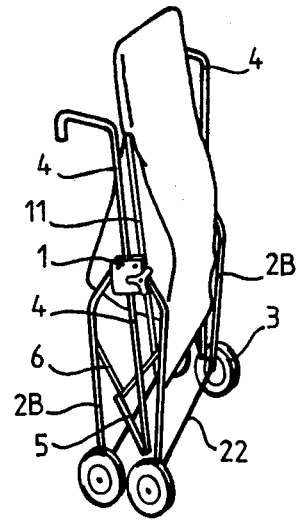
FIG. 5 is a perspective schematic view of the push-chair in the folded flat position, showing its two sides connected by spacers on both sides of the hammock or basket.
Figure 6:
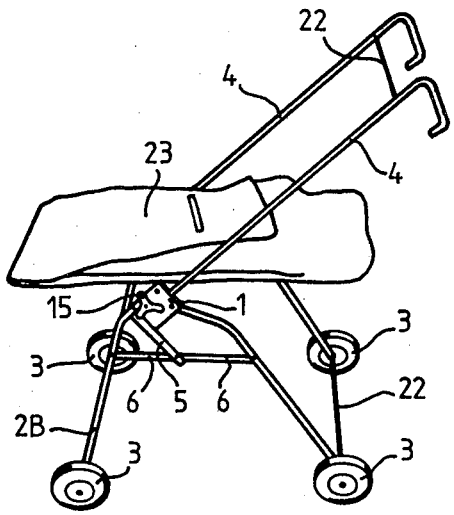
FIGS. 6, 7 and 8 are perspective views of the same push-chair with differing bedding accessories.
Figure 7:
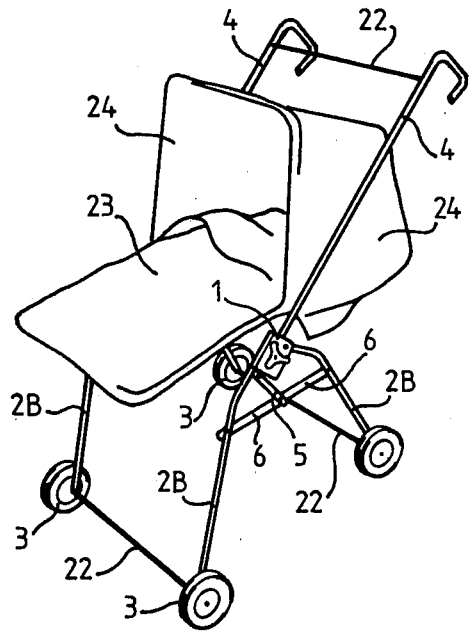
Figure 8:
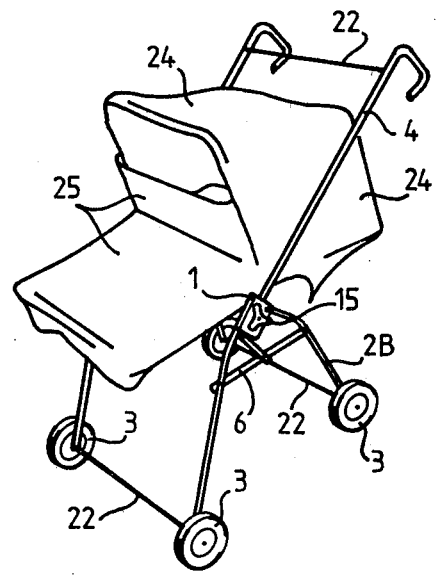

In the "facing mother" position FM and "look ahead" position FR, the portion 2A of one of the branches is received in the corresponding groove 9 of the core 1 (FIGS. 3 and 4). In both positions, the forks 6 articulated as a pair of compasses lie in alignment with one another and are held in such position by means of a boss 20 on one of the forks, penetrating a slot 21 in the other fork.

According to a further form of embodiment, rigid spacers 22 connect both sides of the push-chair as seen on either side of the hammock, basket or bedding. According to still a further form of embodiment, the spacers 22 are foldable and may comprise jointed X-shaped parts, hence enabling transverse folding up and displaying so as to obtain the so-called faggot folding.

The bedding may consist of a down-filled sleeping bag 23 (FIG. 6) or the combination of a bag 23 and a hood 24 (FIG. 7) or else, a combination of a bag 23, a hood 24 and a stocking or protective 25.

In the form of embodiment shown in FIG. 9, there are also to be found tipping cores 1 to which branches 2 are hingedly mounted. Each tipping core 1 is traversed by a pushing arm 4 slidable in said core to control the folding up or displaying of the branches 2. Each pushing arm 4 is connected through a link 5 to two forks 6 jointed as a pair of compasses at 7 to said link, each being articulated at 8 to one of the two branches 2, and each core 1 having on either side of the slidable arm 4 a groove 9 therein for receiving and locking in by the action of a clamp, one of the branches 2, which each are hingedly mounted at 10 in the neighbourhood of one of the ends of the reception groove.

According to still a further form of embodiment, of the invention, the link 5 is formed with a slide groove 27 therein traversed by the shaft 4A of its articulation with the pushing arm 4. In the displayed position, the stroke of the link results from a combined lifting and inclination motion, said inclination being effected as desired either in the "facing mother" direction or the "look ahead" direction. It will be understood that such motion is reversed on folding up the chair.

In the "facing mother" position FM and "look ahead" position FR the portion 2A of one of the branches 2 is received in the corresponding grooves 9 of the core 1, and in both positions, the forks 6 articulated as a pair of compasses lie in alignment with one another and are held in such position by means of an angle iron 20A on one of the forks.

The slidable hinge connection of the link 5 to the pushing arm 4 enables the forks 6 to have pivoting points 8 on the branches of the foot assembly in a much lower position than in the other forms of embodiment. Such arrangement also permits the forks to be used as a footboard. In FIG. 9, one of such forks is extended at 6A outside the foot assembly and reaches by means of a spacer 6B to the fork (not shown) symmetrical thereto on the other side of the push-chair.

The core 1 on each side of the push-chair pivotally carries a longitudinal rod 11 for receiving the hammock or basket, and generally, the bedding to receive a child.

The pivot of the longitudinal rod 11 in the form of the embodiment shown coincides with the hinge axis of one of the two branches 2, and the position of the longitudinal rod with respect to the core can be adjusted by means of a sector 12 with an arcuate slot 13 therein to receive an shaft traversing one of the branches 2 and to be clamped by means of a wing nut 15, such assembly comprising safety means 26.

The branches 2 can be suspended telescopically (mounting 16-17).

It will be understood that this invention was only described and represented in preferential exemplifying forms of embodiment and that equivalent parts can be substituted for its constituents without however departing from its scope as defined in the appended claims.

What we claim is:

1. A reversible foldable push-chair of the slidable umbrella type adapted for folding; or when unfolded displaying either a facing rearward, "facing mother" position, or a facing forward, "look ahead" position, supporting a hammock and comprising on each side of the hammock, a tipping core, two wheel carrier branches hingedly mounted to said tipping core and having a wheel at one end of each of said branches, a pushing arm slidably mounted and traversing said tipping core so that said pushing arm can slidably move through said tipping core and in a tipping motion in relation to the push-chair thereby rotating the position of said tipping core, and link means connecting said pushing arm to said two wheel carrier branches whereby dependent upon the direction of the tipping motion of the handle and of rotation of the position of said tipping core, the push-chair is spread out for displaying and locked in either a "facing mother" position or in a "look ahead" position.

2. The push-chair of claim 1 further characterized by said tipping core having a groove near the hinged connection of each of said branches with said core, for receiving and locking in each of said branches, each of said branches being of an arcuate shape to present a portion receivable in one of said grooves and another portion carrying said wheel positioned nearer to the centerline of the push-chair when the push-chair is in the folded position.

3. The push-chair of claim 1 further characterized by said link means including forks articulated to said branches and to one another in the form of a pair of compasses and lying in alignment with each other when the push-chair is in either the "facing mother" position or the "look ahead" position, a link connecting said forks to said pushing arm, and a locking means to enable said forks to be held in alignment with each other in the unfolded displaying position of the push-chair.

4. The push-chair of claim 1 further characterized by a longitudinal rod carried by said core on each side of the push-chair in a pivotable manner, said longitudinal rod receiving the hammock thereon, and adjusting means to adjust the position of said longitudinal rod with respect to said core.

5. The push-chair of claim 1 further characterized by said branches being telescopically extendable at the ends at which said wheels are mounted.

6. A reversible foldable push-chair of the slidable umbrella type adaptable for folding or for unfolding and spreading out in a facing rearward, "facing mother" position or a facing forward, "look ahead" position, supporting a hammock and comprising on each side of the hammock a tipping core, two wheel carrier branches articulated to said core, a pushing arm slidably mounted and traversing said tipping core so that said pushing arm can slidably move through said tipping core and in a tipping motion in relation to the push-chair thereby rotating the position of said tipping core, link means connecting said pushing arm to said two branches, said tipping core having a groove near the articulation connection of each of said branches with said core for receiving and locking each of said branches in its respective one of said grooves, said link means including forks articulated to said branches and to one another in the form of a pair of compasses and lying in alignment with each other when the push-chair is in either the "facing mother" position or the "look ahead" position, a link connecting said forks to said pushing arm, said link having a slide groove formed to articulate said link with said pushing arm so that when the push-chair is unfolded and spread out the stroke of said link is tranformed to a combined simultaneous lifting and inclination movement, such inclination being effected as desired either in a "facing mother" direction or in a "look ahead" direction.

7. The push-chair of claim 6 further characterized by pivot points at which said forks are articulated to said branches, and means to lower said points to allow use of at least one of said forks as a footboard.

* * * * *